United States Patent Office 2,743,202
Patented Apr. 24, 1956

2,743,202

ANTIOXIDIZING COMPOSITION

Gino Amici, Rome, Italy

No Drawing. Application October 21, 1952,
Serial No. 316,050

5 Claims. (Cl. 148—6.14)

This invention relates to antirust or better, to an antioxidizing composition which is effective not only against rust but also against all oxides produced by metals capable of being oxidised.

The principal object of the invention is to provide an improved composition of the indicated nature which will serve both to remove oxides from metal articles or parts, and to provide protection against further oxidation of such articles or parts.

The composition which can be made at any desired consistency depending upon its intended use, is particularly applicable to firearms which are extremely susceptible to oxidation due to the combined action of the gases of combustion and of atmosphere on the metal parts thereof, and to delicate mechanisms.

This application is a continuation-in-part of my application Serial No. 116,850 filed September 20, 1949, now abandoned.

It is already known to protect metal parts against rusting by coating such parts with a layer of grease and it is also known to dip the parts in petroleum oil for the purpose of removing rust which has already formed thereon.

According to the present invention, there is provided an antioxidizing composition which serves both to remove and reduce rust or other oxides from metal articles and also to protect such articles against further oxidation through the formation on their surface of a protective oxide produced thereon by the oxygen activated by the α-pinenes. The composition includes a combination of saturated hydrocarbons in liquid form, such as fluid paraffin and gasoline: the hydrocarbons being present in sufficient quantity to dissolve existing rust or other oxides and to clean the metal surfaces. The composition further includes at least one liquid terpenic hydrocarbon comprising α-pinenes, which are capable of readily absorbing oxygen both from the dissolved oxides and from atmosphere and for this reason they change into a peroxidized condition in which they will then act as an oxidising agent.

The liquid terpenic hydrocarbon in such oxidizing form will adhere to the surface of the metal in a thin film of said combination of saturated hydrocarbons and will produce on such surface, by means of the oxygen activated by the α-pinenes, an oxide capable of protecting the said surface from further oxidation.

The present inventor has found that a liquid terpenic hydrocarbon, i. e., a terpenic essence comprising α-pinenes such as can be produced from Pinus, Eucalyptus, juniper and many other plants, when mixed with saturated hydrocarbons such as fluid paraffin and gasoline provides an effective antioxidizing composition.

As previously stated, the liquid terpenic essence in the use of such composition performs a two-fold task:

In the first time, the α-pinenes comprised in the terpenic essence, after the antioxidizing composition has been spread on the metal to be protected, act as a deoxidizing agent absorbing oxygen from the air and reducing the rust or other kind of oxide formed on the metal. Secondly, after the α-pinenes comprised in the terpenic essence have become saturated or peroxidated by the absorbed oxygen, the terpenic essence becomes itself an oxidising agent and then, according to the well known action of the peroxides, produces on the metal surfaces to be protected, a peculiar kind of oxide which is very similar to the oxide obtained by an electrolytic oxidation of the metal and which protects the metal from further oxidation. The α-pinenes which enable the accomplishment of the foregoing, are terpenic hydrocarbons having the formula $C^{10}H^{16}$

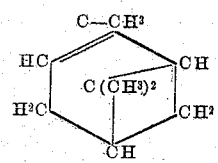

and because of their properties of autoxidation and of activation of the oxygen, they are the active component of the present antioxidizing composition. As soon as such composition has been spread on metals to be protected, the α-pinenes begin to absorb oxygen through the double bond existing in their molecule and in this way they form a product of oxidation of peroxidic nature, i. e., $C^{10}H^{16}O^4$ which is capable of giving up half of its oxygen, the other half of the oxygen remaining fixed to the essence.

The released oxygen, activated by the α-pinenes, possesses such active oxidizing properties as to be capable of oxidizing even some substances that the atmospheric oxygen per se is not capable of oxidizing.

The α-pinenes are the most widely spread terpenic hydrocarbons found in nature, and they are comprised in several essences in both their optical varieties: levo and dextro rotatory.

Examples of terpenic essences comprising α-pinenes dextro-rotatory are the essences from cypress, anise, laurel, nutmeg, fennel, camphor, myrtle, *Eucalyptus globulus*, and many others such as the American essence of turpentine from *Pinus palustris* and the German and Swedish essences of turpentine from *Pinus silvestris*, and so on.

Examples of terpenic essences comprising α-pinenes levo-rotatory are the essences from needles or leaves of pinus pumilius and silvestris, white cinnamon, valerian, thyme, lavender, the French essence of turpentine from *Pinus maritima* and many others.

There is also the racemic variety of α-pinenes which is optically inactive, and is produced synthetically.

Though all terpenic essences or materials comprising α-pinenes are suitable for my antioxidizing composition, provided they are rectified or purified from their content in acidity and impurities, it is obvious from a practical and economical standpoint that it will be preferable to use, in my antioxidizing composition, those essences which are readily obtainable commercially and are less costly, and which include the greatest amount of α-pinenes components, as for instance, the rectified essences of pinus, eucalyptus, juniper, etc.

In the use of the present antioxidizing composition, it will be noted that the protection of the oxidizable metals is actually accomplished by the oxide produced in the second stage of its action as aforesaid, by the oxygen activated by the α-pinenes and not by a film of grease or fat as is generally the case with other antirust compositions.

The combination of saturated hydrocarbons in liquid form (gasoline, petroleum oil, fluid paraffin, and the like) in the antioxidizing composition, has for its primary purpose, the uniting and combining of the liquid terpenic essences into one homogeneous compound, thus preventing the α-pinenes component from evaporating with its usual rapidity and thereby retaining it in contact with the metal for a sufficient length of time to enable it to perform on the metal being treated, firstly a deoxidizing action, and secondly, an oxidizing action.

The gasoline also acts to clean the surface of the metal and where necessary, removes and dissolves the rust or other oxides which may originally be present on the metal, thereby facilitating the direct contact of the α-pinenes with such rust or oxides during the first deoxidizing action, and subsequently with the metal for the oxidizing action. The fluid paraffin acts also as a lubricating agent.

From what has been said, it will be understood that the antioxidizing composition of the present invention is a practical utilization based on the peculiar properties of autoxidation and of activation of the oxygen possessed by the α-pinenes, and is realised by the incorporating or combining of these substances in definite proportions into one homogeneous compound, in particular kinds of saturated hydrocarbons in liquid form with the intent of preventing the α-pinenes from evaporating with their usual rapidity and with the result of enhancing their properties, thus maintaining them in direct contact with the metals for a sufficiently long time to enable them to accomplish both their described actions even in the open air.

The density of the composition depends on obtaining a homogeneous product in which the components have not tendency to separate and having a consistency which is suitable to the conditions under which it is to be used. Thus, when the composition is intended for use on firearms or delicate mechanisms, the composition should be diluted with gasoline to a point which can be found experimentally, at which it will not become so fluid in hot climates as to run off the metal parts to which it is applied and thereby leave the surfaces thereof uncovered by the composition, or at which it will not solidify or become too dense in cold climates.

An effective and commercially economical composition, which has given good results through ranges of temperatures greater than normally encountered, is obtained by utilizing fluid paraffin to provide the oily content, then diluting the paraffin as required by the addition of gasoline, and finally adding one or several liquid terpenic essences or materials comprising α-pinenes in sufficient quantity to act as a reducing agent on the oxides dissolved and removed by the gasoline, and then after having become oxidized, serve as an oxidising agent to produce on the metal surface a thin protective coating of oxide of a type capable of preventing further oxidation of the metal.

As a result of the action of the compound on the metal surface, the latter is modified chemically so that it becomes in effect immune from atmospheric oxidation or any other chemical action by gaseous agent for a long period, and this is accomplished without changing in the smallest degree the size or volume of the metal.

The modification of the metal surface can be observed when the oily portion of the compound remaining on the surface of the metal is removed because there occurs also a modification in the color of the metal. In the case of iron, this assumes a color varying from a very light grey to a darker grey and it can even become a bluish grey, just as occurs in the protective oxidation of iron by electrolytic method.

I have also found that as a result of the retardation of the evaporation of the α-pinenes by the combination of saturated hydrocarbons, it is possible to obtain from a relatively small quantity of terpenic essences comprising α-pinenes, an amount of action much greater and more efficient than that which could be obtained even from a much larger quantity of aforesaid terpenic essence alone, which latter I have found, will evaporate with its usual rapidity without having sufficient time to accomplish both the aforesaid described actions.

The compound after it has performed both its chemical actions as above described, can readily be removed by a cloth if it is not desired to retain it on the metal surfaces to act as a lubricating agent.

The compound has been found to be effective not only for the protection of iron or steel, but also for the protection of those metals (zinc, brass, alloys of lead, antimony, silver, etc.) which are more or less affected by the action of gaseous agents contained in the atmosphere, as for example, iodine, chlorine, sulphur and so on.

Thus, in the case of silver whose surface is altered by the action of sulphurated hydrogen, the black, bluish or greyish spots of sulphide become discolored by the action of my compound, very probably due to the fact that the sulphide is transformed into sulphate of silver and then disappear completely when the metal is rubbed with a cloth wetted in my compound.

The silver as a result of this treatment remains polished and bright for a long time.

As has been explained, the protection of these metals is actually due to the formation of an effective protecting oxide or to immunization or passivation of the metal through the action of the oxygen activated by the α-pinenes, which, being mixed with fluid paraffin and gasoline, have the opportunity of coming and remaining in direct contact with the surface of the metals for a sufficiently long time to become peroxidized in the initial phase of the application of the compound on metals and later to oxidize the surface of the metal.

The preparation and proportions of each component or ingredient should be such that there results a composition having the desired density which is perfectly homogeneous, which on being left for long periods does not permit any of its components to separate or precipitate and which includes α-pinenes in sufficient amount to render such composition capable of protecting the metal to which it has been applied against oxidation in the manner aforesaid.

I have found that for the best results depending upon the condition under which the composition is to be used, the combination of saturated hydrocarbons should constitute from about 70% to about 85% by volume, of the entire composition, and that the liquid terpenic hydrocarbons comprising α-pinenes or a combination of such hydrocarbons comprising α-pinenes should constitute from about 25% to about 15% by volume, of the entire composition, the α-pinenes content in the composition preferably comprising from about 20% to about 10% by volume, of the composition.

In those compositions in which the combination of saturated hydrocarbons is constituted of fluid paraffin and gasoline, the fluid paraffin may constitute from about 60% to about 70% by volume of the entire composition, and the gasoline may constitute from about 25% to about 15% by volume of the entire composition.

The following is an example of composition which has proved satisfactory in practice:

EXAMPLE

| | |
|---|---|
| Liquid paraffin | 70 cc. |
| Gasoline | 15 cc. |
| Terpenic essences or materials comprising α-pinenes as the essences of Pinus, Eucalyptus, Juniper, and others, or a combination of two or more terpenic essences or materials comprising α-pinenes. | 15 cc. or more, according to their content in α-pinenes. |

The above example is of an antioxides composition which can serve also as a lubricant for working parts.

Characteristics of the above composition:
  Liquid, limpid, transparent
  Colorless
  Absolute stability and perfectly homogeneous so that on being left for long periods, none of its components will separate or precipitate
  Odor similar to that of its components (gasoline and terpenic essences)
  D (15° C.)=between 0.8 and 0.9
  Viscosity (25° C.)=2 Engler
  Reaction=neutral The relative amounts given for each component in the above example are those which in practice have been found to obtain the best results.

It should however be appreciated that the proportion of each component can be varied to suit the conditions and purposes for which the composition is to be used and without loss of the antioxidizing or lubricating or preserving qualities of the composition, which qualities are based upon the association or combination of the essential ingredients and specially on the peculiar properties of autoxidation and of activation of the oxygen possessed by the α-pinenes.

The composition given in the example has excellent lubricating properties because it is sufficiently fluid to facilitate relative movements between working metal parts while it does not congeal or coagulate under intense cold, or readily becomes too fluid in warm climatic conditions so as to leave the metal to which it is to be applied, unprotected.

The detergent, reducing, and oxidising qualities of the composition are best demonstrated by the fact that when the composition is used for internal cleaning of firearms in which high explosive charges have been used, the residue of combustion of the powders is dissolved and removed, and the ensuing oxidation substantially prevented.

Since the composition does not tend to dry on the parts to which it has been applied, it does not form a patina or coating which would impede the action of moving parts and which afterwards will be difficult to remove.

It will be understood that one or more of the components herein designated may be replaced by similar material or materials having corresponding properties, without departing from the spirit of the invention or the scope of the appended claims.

I claim:

1. An antioxidizing composition for protecting metal articles against rust or other kinds of oxidation, comprising two saturated hydrocarbons selected from the group consisting of liquid paraffin, gasoline and petroleum oil, and a liquid hydrocarbon comprising a pinene capable of readily absorbing oxygen to become first oxidized and then act as an oxidizing agent to produce a protecting oxide on the metal surface, said saturated hydrocarbons constituting from about 70% to 85% by volume, of the composition and being present in sufficient quantity to retard the evaporation of the α-pinenes for a sufficient period to enable them to accomplish both the aforesaid actions, and said liquid hydrocarbon consisting essentially of α-pinene and constituting from about 15% to 25%, by volume, of the composition and being present in sufficient amount to produce a protecting oxide on the metal surface and to render, in this way, the composition capable of protecting the metal to which it is applied against further oxidation.

2. An antioxidizing composition for protecting metal articles against rust or other kinds of oxidation, comprising two saturated hydrocarbons selected from the group consisting of liquid paraffin, gasoline and petroleum oil, and a liquid terpenic hydrocarbon comprising α-pinene, said saturated hydrocarbons constituting from about 70% to 85%, by volume, of the composition and being present in sufficient quantity to enable the ready removal of existing rust or other oxides on the metal surface and the cleaning of such surface, and the liquid terpenic hydrocarbon constituting from about 25% to 15%, by volume, of the composition and consisting essentially of α-pinenes which are capable of readily absorbing oxygen from the existing rust or other oxides and from the atmosphere to become first oxidized and then act as an oxidizing agent to produce a protecting oxide on the metal surface, and said α-pinenes constituting from about 20% to 10%, by volume, of the composition and being present in sufficient amount to render the composition capable of protecting the metal to which it is applied against oxidation.

3. An antioxidizing composition such as defined n claim 1 in which he liquid hydrocarbon comprising α-pinene is composed of a terpenic essence consisting essentially of α-pinenes.

4. An antioxidizing composition such as defined in claim 1 in which said saturated hydrocarbons consist of liquid paraffin and gasoline.

5. An antioxidizing composition such as defined in claim 1 in which said saturated hydrocarbons consist of 70 cc. of liquid paraffin, 15 cc. of gasoline and 15 cc. of liquid hydrocarbon consisting essentially of α-pinenes.

References Cited in the file of this patent

UNITED STATES PATENTS

| 1,344,338 | Eisenhauer | June 22, 1920 |
| 2,186,018 | Griesinger | Jan. 9, 1940 |
| 2,291,460 | Francis | July 28, 1942 |

FOREIGN PATENTS

| 25,081 | Great Britain | of 1903 |
| 248,463 | Great Britain | Sept. 1, 1925 |